United States Patent
Sugiura et al.

(10) Patent No.: US 8,170,564 B2
(45) Date of Patent: May 1, 2012

(54) COMMUNICATION TERMINAL APPARATUS, NETWORK SYSTEM AND HANDOVER METHOD

(75) Inventors: Mikihito Sugiura, Kanagawa (JP); Tomoharu Kaneko, Kanagawa (JP); Shinkichi Ikeda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 473 days.

(21) Appl. No.: 12/439,967

(22) PCT Filed: Sep. 4, 2006

(86) PCT No.: PCT/JP2006/317472
§ 371 (c)(1),
(2), (4) Date: Jun. 23, 2009

(87) PCT Pub. No.: WO2008/029441
PCT Pub. Date: Mar. 13, 2008

(65) Prior Publication Data
US 2010/0035618 A1    Feb. 11, 2010

(51) Int. Cl.
*H04W 36/00* (2009.01)
(52) U.S. Cl. ........ 455/442; 370/352; 455/436; 455/437; 455/438; 455/439
(58) Field of Classification Search .............. 455/432.1, 455/435.1, 435.2, 442, 444, 436–439; 370/352
See application file for complete search history.

(56) References Cited

U.S. PATENT DOCUMENTS

| | | | |
|---|---|---|---|
| 7,200,139 B1* | 4/2007 | Chu et al. ..................... | 370/352 |
| 2002/0085516 A1 | 7/2002 | Bridgelall | |
| 2004/0033805 A1 | 2/2004 | Verma et al. | |
| 2004/0077349 A1* | 4/2004 | Barak et al. ................... | 455/436 |
| 2005/0288027 A1* | 12/2005 | Cho et al. ...................... | 455/442 |
| 2007/0072615 A1* | 3/2007 | Kim et al. ...................... | 455/436 |
| 2007/0238467 A1* | 10/2007 | Buckley et al. ............... | 455/445 |

(Continued)

FOREIGN PATENT DOCUMENTS

JP    2003-235064 A    8/2003
(Continued)

OTHER PUBLICATIONS

3GPP TR 23.806 V7.0.0, 3rd Generation Partnership Project; Technical Specification Group Services and System Aspects; Voice call Continuity between CS and IMS Study (Release 7), Dec. 2005, pp. 1-153.

(Continued)

*Primary Examiner* — Danh Le
*Assistant Examiner* — Dinh P Nguyen
(74) *Attorney, Agent, or Firm* — Seed IP Law Group PLLC

(57) ABSTRACT

A communication terminal apparatus wherein even if there occurs a dropout or overtaking of call control messages, the current service can be continued without increasing the load of an apparatus such as a server in the network. In this apparatus, a VoIP call control part (103) performs call controls including both a call establishment of a VoIP telephone conversation using a wireless LAN system and a call disconnection thereof. A line switching call control part (104) performs call controls including both a call establishment of a line switching telephone conversation using a mobile communication (cellular) system and a call disconnection thereof. A handover part (105) determines the reception quality of the wireless LAN system and that of the mobile communication (cellular) system and controls, based on the determination results, the handover between the wireless LAN system and the mobile communication (cellular) system.

8 Claims, 12 Drawing Sheets

U.S. PATENT DOCUMENTS

2007/0248079 A1* 10/2007 Jayaram et al. ............... 370/352
2008/0268844 A1* 10/2008 Ma et al. ...................... 455/436

FOREIGN PATENT DOCUMENTS

| JP | 2004-172882 A | 6/2004 |
| JP | 2004-297591 A | 10/2004 |
| JP | 2005-130487 A | 5/2005 |
| JP | 2005-311702 A | 11/2005 |

OTHER PUBLICATIONS

3GPP TS 23.206 V1.1.0, 3rd Generation Partnership Project; Technical Specification Group Services and System Aspects; Voice call Continuity between CS and IMS, Stage 2 (Release 7), Jul. 2006, pp. 1-32.

Cho et al., "A seamless handover between cdma2000 and WLAN for 3G-WLAN interworking service continuity," Proceeding of the Advanced Industrial Conference on Telecommunications/Service Assurance with Partial and Intermittent Resources Conference/E-Learning on Telecommunications Workshop, Jul. 17, 2005, 6 pages.

Extended European Search Report for corresponding EP Application No. 06797395.8, dated Sep. 12, 2011, 7 pages.

* cited by examiner

COMMUNICATION TERMINAL APPARATUS, NETWORK SYSTEM AND HANDOVER METHOD

TECHNICAL FIELD

The present invention relates to a communication terminal apparatus, a network system and a handover method. More particularly, the present invention relates to a communication terminal apparatus, a network system and a handover method that allows connection with networks adopting different communication schemes and handover between such networks.

BACKGROUND ART

Presently, system development has proceeded in systems where radio communication terminals freely perform handover between systems of a mobile communication (cellular) system which allows a lower data transmission rate yet covers a wider area and a wireless LAN system which allows a higher data transmission rate yet covers a smaller area. Particularly, in 3GPP (3rd Generation Partnership Project) planning communication standards for mobile communications, studies are underway to standardize a handover scheme capable of continuing voice communication between circuit-switched voice communication and VoIP voice communication (see, 3GPP draft TR (Technical Report) 23.806, TS (Technical Specification) 23.206). Further, the technique disclosed in Patent Document 1 is known as a handover scheme between circuit-switched voice communication and VoIP voice communication.

To perform handover between a circuit-switched network supporting circuit-switched voice communication and an IP network supporting VoIP voice communication while enjoying telephone service, as shown in FIG. 12 of Patent Document 1, the steps of establishing a call for the target domain and then disconnecting the call from the source domain are used. In Patent Document 1, terminals calling each other perform call control, and, as studied in 3GPP TR 23.806, by relaying a call by one server or a plurality of servers in a network and by converting call control messages and converting medias between circuit-switched voice media and VoIP voice media, it is possible that handover is performed regardless of the call connection schemes communicating parties support.

Patent Document 1: Japanese Patent Application Laid-Open No. 2004-297591

DISCLOSURE OF INVENTION

Problems to be Solved by the Invention

However, in the conventional system studied in 3GPP TR 23.806, the network configuration becomes complicated, and therefore there may be cases where the steps of establishing a call with the target domain and then disconnecting the call with the source domain cannot be executed sequentially, as shown in FIG. 12 of Patent Document 1. In that case, due to loss of call control messages and the difference of the transmission delay between a circuit-switched network and an IP network used in VoIP, voice communication is suspended and the time voice is interrupted increases.

For example, in a situation where a call control message for the target domain network is lost and a call for a target domain network is not established, if a call from the source domain is disconnected, there is a problem that voice communication is suspended. Further, due to transmission delay of the network, if a call from the source domain is disconnected before a call control message for the target domain network is established, there is a problem that the time required for handover increases and the time voice is interrupted increases.

FIGS. 1 to 3 are sequence diagrams showing handover schemes studied in 3GPP supporting voice communication continuing between circuit-switched voice communication and VoIP voice communication.

FIG. 1 shows a sequence diagram showing a case where handover is executed normally, and VoIP voice communication switches to circuit-switched voice communication. In FIG. 1, a radio communication terminal transmits a setup message, which requests a handover (step ST 11, step ST 12, step ST 13 and step ST 14), and a handover management server having received the request for a handover transmits a message for establishing a call with the target domain (step ST 15, step ST 16, step ST 17 and step ST 18). Then, the radio communication terminal having received a connect message, which is for establishing the call with the target domain, transmits a connect Ack message, which is a response to the connect message (step ST 19). Then, the handover management server receives the response to the message for establishing a call with the target domain (step ST 20 and step ST 21) and transmits a bye message, which requests disconnection of the call with the source domain (step ST 22 and step ST 23). Then, the radio communication terminal having received the bye message transmits a 200 OK message, which is a response to the bye message (step ST 24 and step ST 25). Here, steps ST 11 to ST 19 form a sequence for establishing a call for circuit-switched, which is the target domain, and steps ST 22 to ST 25 form a sequence for disconnecting the call from a VoIP, which is the source domain. FIG. 1 only describes apparatuses and messages related to the present invention.

FIG. 2 is a sequence diagram showing a case where a connect message, which is circuit-switched call control, is lost over the radio. After receiving the 200 OK message transmitted from the SIP (Session Initial Protocol) server (step ST 16), the call control switch server transmits an ANM (Answer Message, step ST 17) to a circuit-switched server in a mobile communication circuit-switched network and at the same time transmits an Ack to the SIP server (step ST 20 and ST 21), so that, the handover management server transmits a bye message to SIP server regardless of whether the transmission of a connect message is successful or failed (step ST 22 and step ST 23). By transmitting and receiving the bye message and the 200 OK message, which is a response to the bye message, VoIP voice communication is disconnected. If the radio communication terminal cannot receive the connect message due to bad channel condition or if the connect message is tried to be retransmitted but failed between the circuit-switched server and the radio communication terminal, the VoIP call is disconnected in a state where a circuit-switched call is not established, and so communication is not possible.

FIG. 3 shows a sequence diagram showing a case where a bye message, which is call control, is received and later a connect message, which is call control, is received (i.e. outrun). By the operation of retransmitting the connect message due to transmission delay in the circuit-switched network or poor radio environment, it is possible that a connect message arrives at the radio communication terminal (step ST 50 and step ST 51) later than the bye message via the IP network (step ST 22 and step ST 23). In this case, circuit-switched voice communications tarts after VoIP voice communication is disconnected, and so the time voice is interrupted increases.

Neither 3GPP TR 23.806 nor Patent Document 1 makes clear operations in a case where call control messages are lost or where call control messages are outrun. Further, there are cases where call control is conducted in different networks, and so handshaking communication cannot be carried out, and, when messages are lost, the above problem occurs. In this case, it is possible to cope with apparatuses such as servers in the networks, but modification of existing systems and protocols may increase, thereby increasing the cost.

The present invention is made in view of the above-described problems, and it is therefore an object of the present invention to provide a communication terminal apparatus, a network system and a handover method that make it possible to continue services without increasing loads of apparatuses such as servers in networks, even when call control messages are lost and call control messages are outrun.

Means for Solving the Problem

The communication terminal apparatus of the present invention adopts a configuration including: a call control section that performs call control including call establishment and call disconnection for each network adopting a different communication scheme; a received quality measurement section that measures received quality of said each network adopting a different communication scheme; and a handover control section that, in a case where a handover is performed between the networks adopting different network schemes based on the measured received quality, when a call with a target domain is not established in the call control section, makes the call control section not disconnect a call with a source domain and requests a repetition of the handover.

The network system of the present invention adopts a configuration including: a communication terminal apparatus that performs a handover between networks adopting different communication schemes based on received quality in the networks adopting different communication schemes, and, when a call with a target domain is not established upon the handover, makes the call with a source domain not disconnect and requests a repetition of the handover; and a handover management server that requests disconnection of the call with the source domain by receiving a request for a handover from the communication terminal apparatus and requests establishment of a call with the target domain.

The handover method of the present invention includes steps of: performing call control including call establishment and call disconnection for each network adopting a different communication scheme; received quality of said each network adopting a different communication scheme; and in a case where a handover is performed between the networks adopting different network schemes based on the measured received quality, requesting a repetition of the handover without disconnecting a call with a source domain when a call is not established with a target domain.

Advantageous Effect of the Invention

According to the present invention, it is possible to continue services without increasing loads of apparatuses such as servers in networks, even when call control messages are lost and call control messages are outrun.

BEST MODE FOR CARRYING OUT THE INVENTION

Now, embodiments of the present invention will be described in detail with reference to the accompanying drawings.

Embodiment 1

Figure 1:
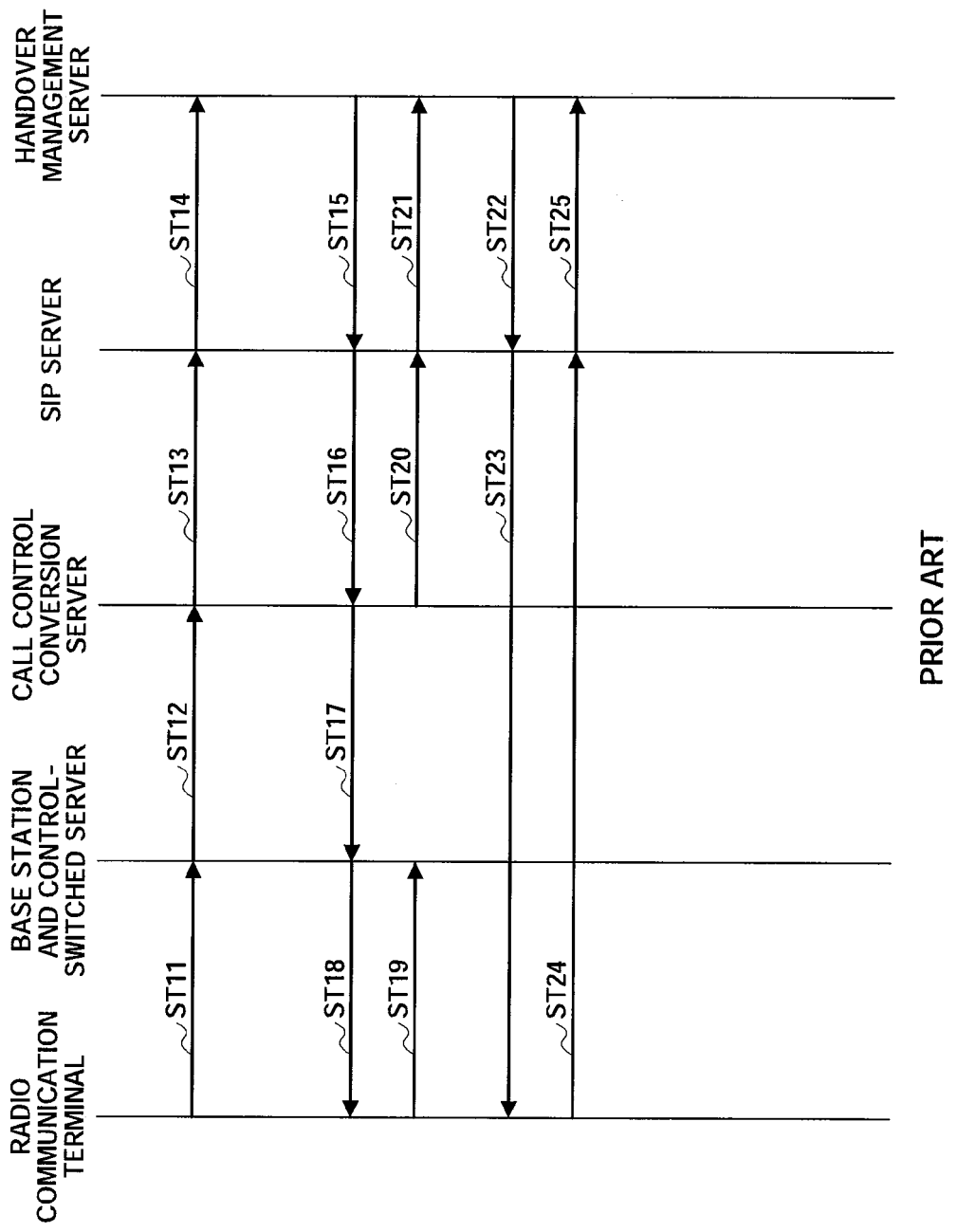
FIG. 1 illustrates a sequence diagram showing a conventional handover scheme.
Figure 2:
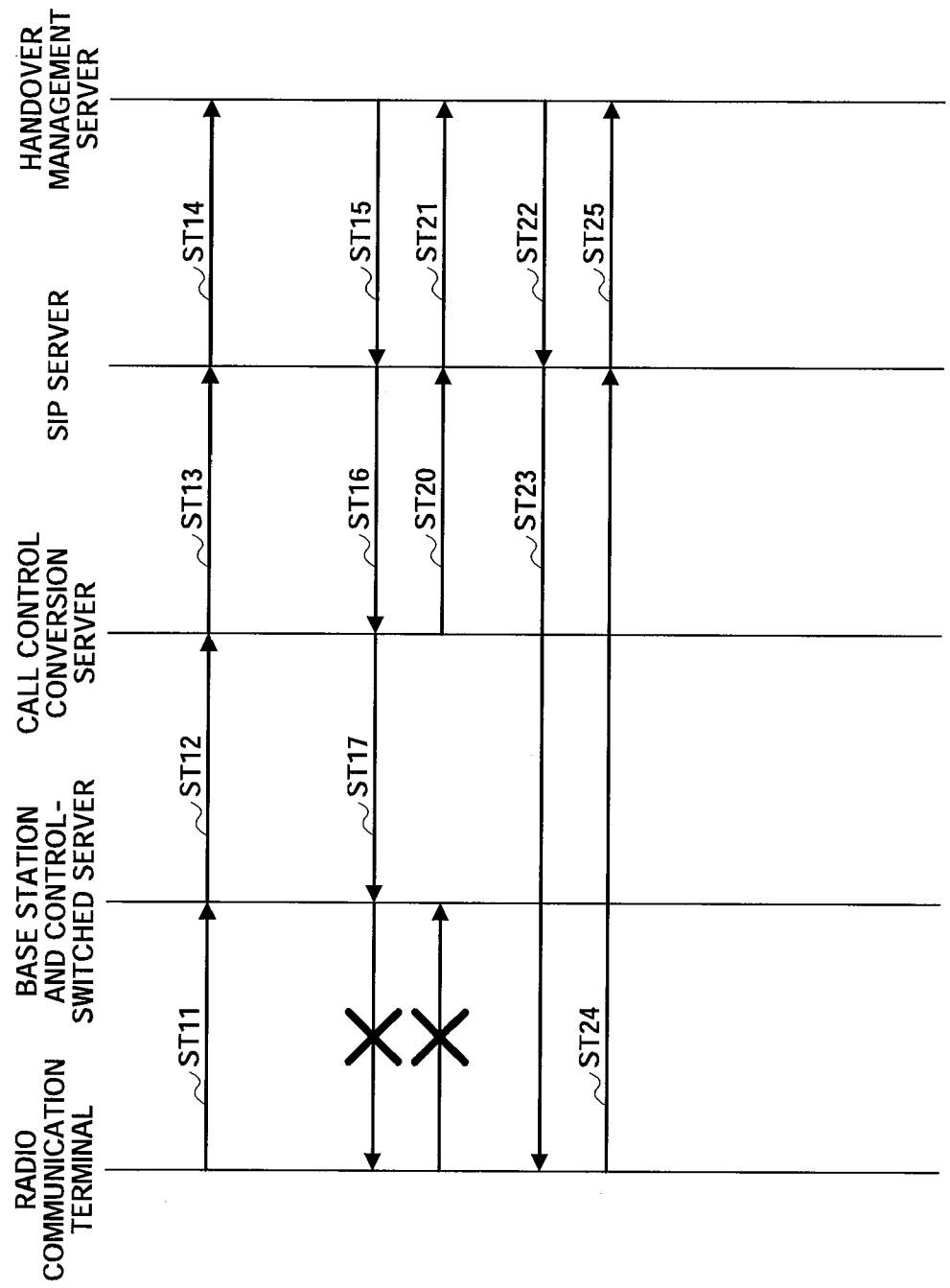
FIG. 2 illustrates a sequence diagram showing a conventional handover scheme.
Figure 3:
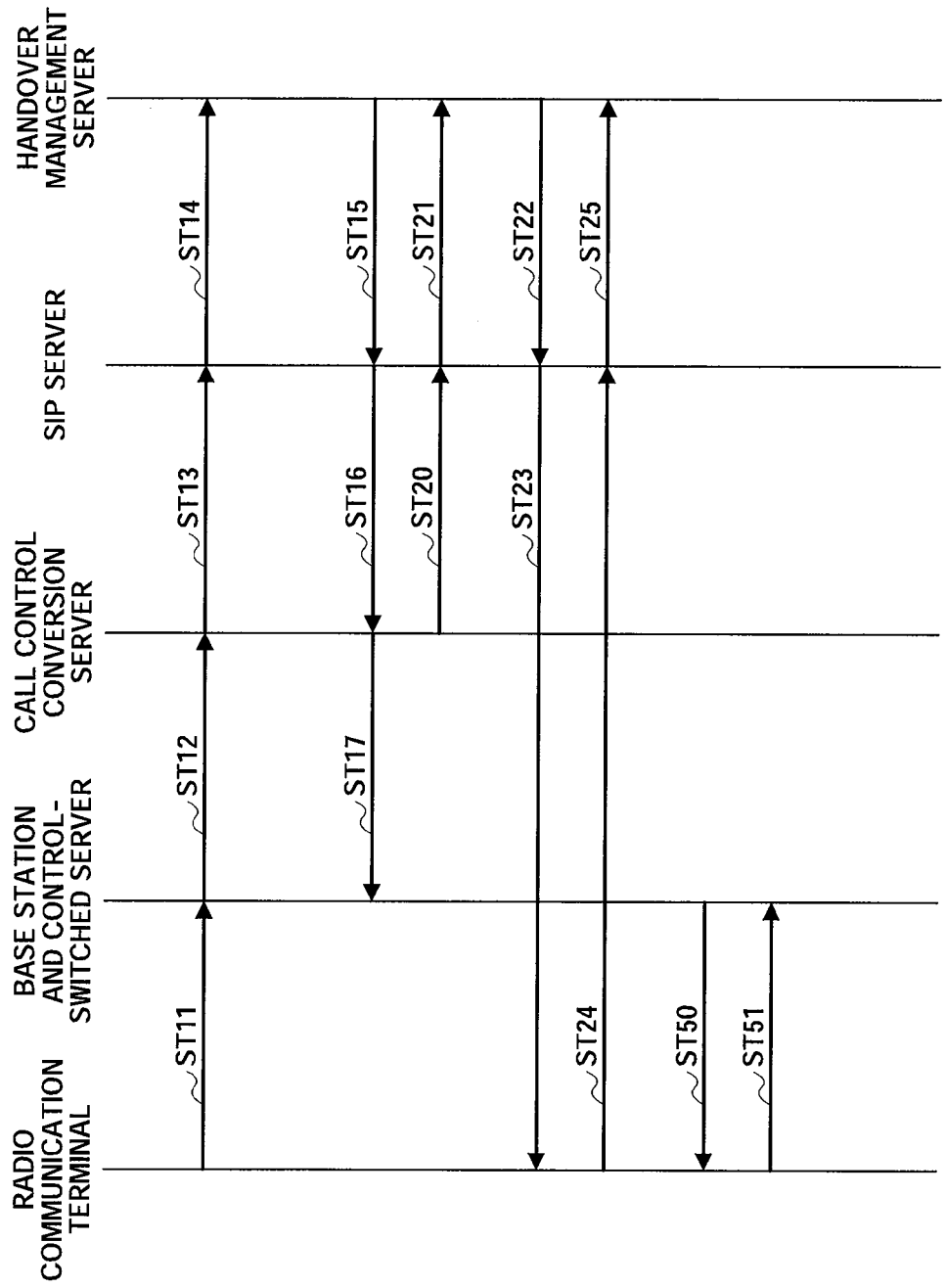
FIG. 3 illustrates a sequence diagram showing a conventional handover scheme.
Figure 4:
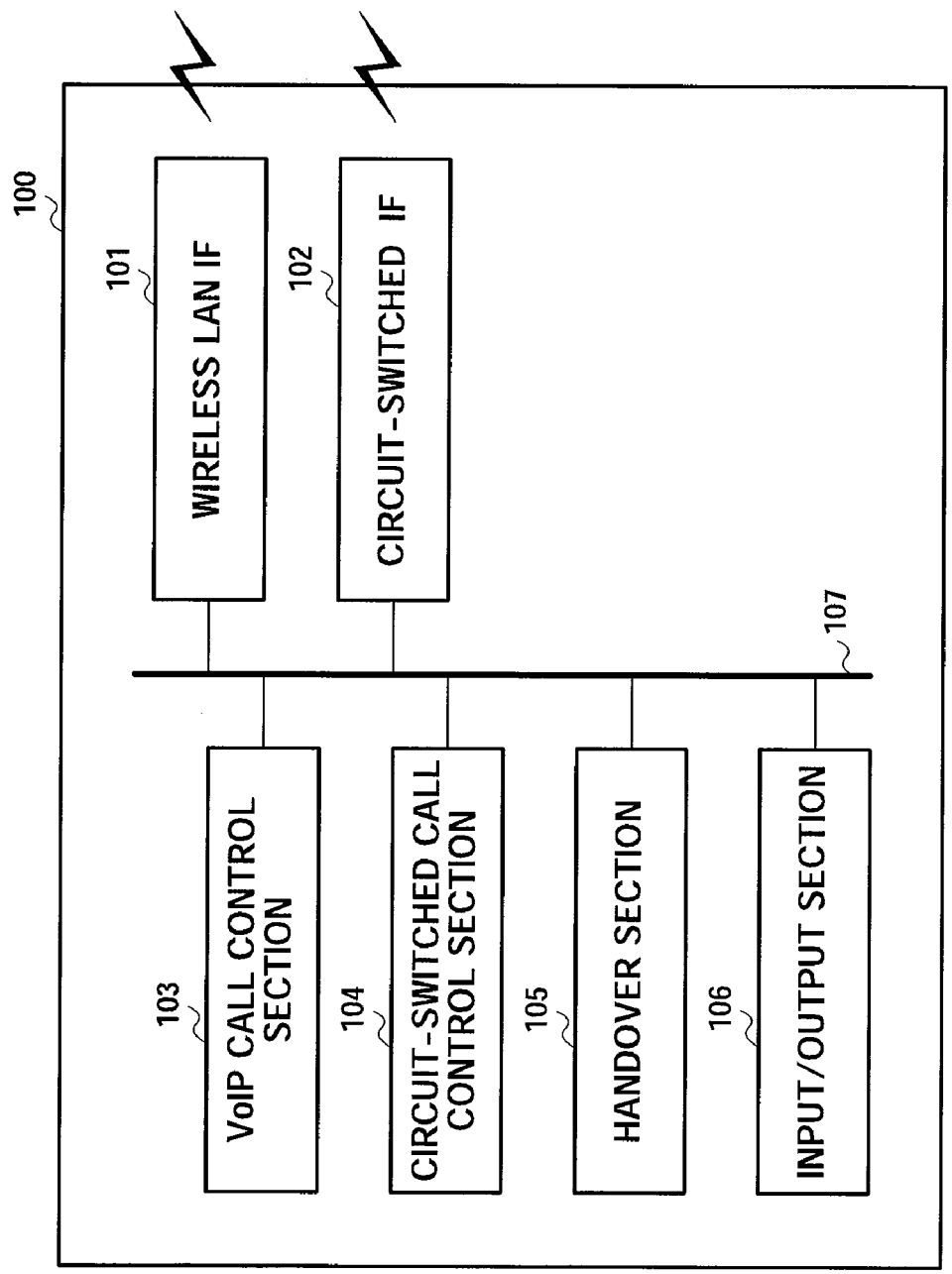
FIG. 4 is a block diagram showing the configuration of the communication terminal apparatus, according to Embodiment 1 of the present invention.

FIG. 4 is a block diagram showing the configuration of communication terminal apparatus 100 according to Embodiment 1 of the present invention. In FIG. 4, wireless LAN IF 101, circuit-switched IF 102, VoIP call control section 103, circuit-switched call control section 104, handover section 105 and input/output section 106 are connected by bus 107.

Wireless LAN IF 101 receives a VoIP voice communication signal by a wireless LAN system, and outputs the received signal to VoIP call control section 103, handover section 105 and input/output section 106, via bus 107. Further, wireless LAN IF 101 transmits signals of VoIP voice communication by a wireless LAN system, inputted from VoIP call control section 103, handover section 105 and input/output section 106 via bus 107. Further, wireless LAN IF 101 transmits a message for call establishment inputted from VoIP call control section 103, and outputs a received message for call disconnection to VoIP call control section 103. Further, wireless LAN IF 101 transmits a message for requesting a handover inputted from handover section 105.

Circuit-switched IF 102 receives a circuit-switched voice communication signal by a mobile communication (cellular) system, and outputs the received signal to circuit-switched call control section 104, handover section 105 and input/output section 106, via bus 107. Further, circuit-switched IF 102 transmits signals of circuit-switched voice communication by a mobile communication (cellular) system inputted from circuit-switched call control section 104, handover section 105 and input/output section 106 via bus 107. Further, circuit-switched IF 102 transmits a message for call establishment inputted from circuit-switched call control section 104, and outputs a received message for call disconnection to circuit-switched call control section 104. Further, circuit-switched IF 102 transmits a message for requesting a handover inputted from handover section 105. In this case, the VoIP voice communication by the wireless LAN system and the circuit-switched voice communication by the mobile communication (cellular) system refer to networks adopting different communication schemes.

VoIP call control section 103, which is a call control means, outputs messages related to call establishment and call disconnection to wireless LAN IF 101 via bus 107, and receives as inputs of messages related to call establishment and call disconnection from wireless LAN IF 101 via bus 107, thereby performing call control of call establishment and call disconnection of VoIP voice communication by a wireless LAN system. Further, if VoIP call control section 103 receives a command from handover section 105 to disable a call disconnection request, VoIP call control section 103 disables a message for requesting a call disconnection inputted from wireless LAN IF 101, to prevent a call from disconnection.

Circuit-switched call control section 104, which is a call control means outputs the message related to call establishment and call disconnection to circuit-switched IF 102 via bus 107, and receives as input of the messages related to call establishment and call disconnection from circuit-switched IF 102 via bus 107, thereby performing call control of call establishment and call disconnection of circuit-switched voice communication by a mobile communication (cellular) system. Further, if circuit-switched call control section 104 receives a command from handover section 105 to disable a call disconnection request, circuit-switched call control section 104 disables a message for requesting a call disconnection inputted from circuit-switched IF 102, to prevent a call from disconnection.

Handover section 105 monitors the state of call control conducted by VoIP control section 103, the state of a call established by the call control and the state of a call disconnected by the call control, and monitors the state of call control conducted by circuit-switched call control section 104, the state of a call established by the call control and the state of a call disconnected by the call control. Further, handover section 105 measures the received quality of the wireless LAN system from the signal inputted from wireless LAN IF 101 and the received quality of the mobile communication (cellular) system from the signal inputted from circuit-switched IF 102, and controls the handover between the wireless LAN system and the mobile communication (cellular) system based on the measurement results. Further, after a handover request accompanying the handover control, if VoIP call control section 103 or circuit-switched call control section 104 receives the message for requesting disconnection of the call with the source domain and if a call with the target domain is not established, handover section 105 commands VoIP call control section 103 or circuit-switched call control section 104 to disable the request to disconnect the call with the source domain. The configuration of handover section 105 will be explained later in detail.

By establishing a call selected in handover section 105, input/output section 106 provides a user with various services received at wireless LAN IF 101 or circuit-switched IF 102 and inputted via bus 107, through input/output apparatuses such as a microphone, a receiver, speakers or a display.

Figure 5:
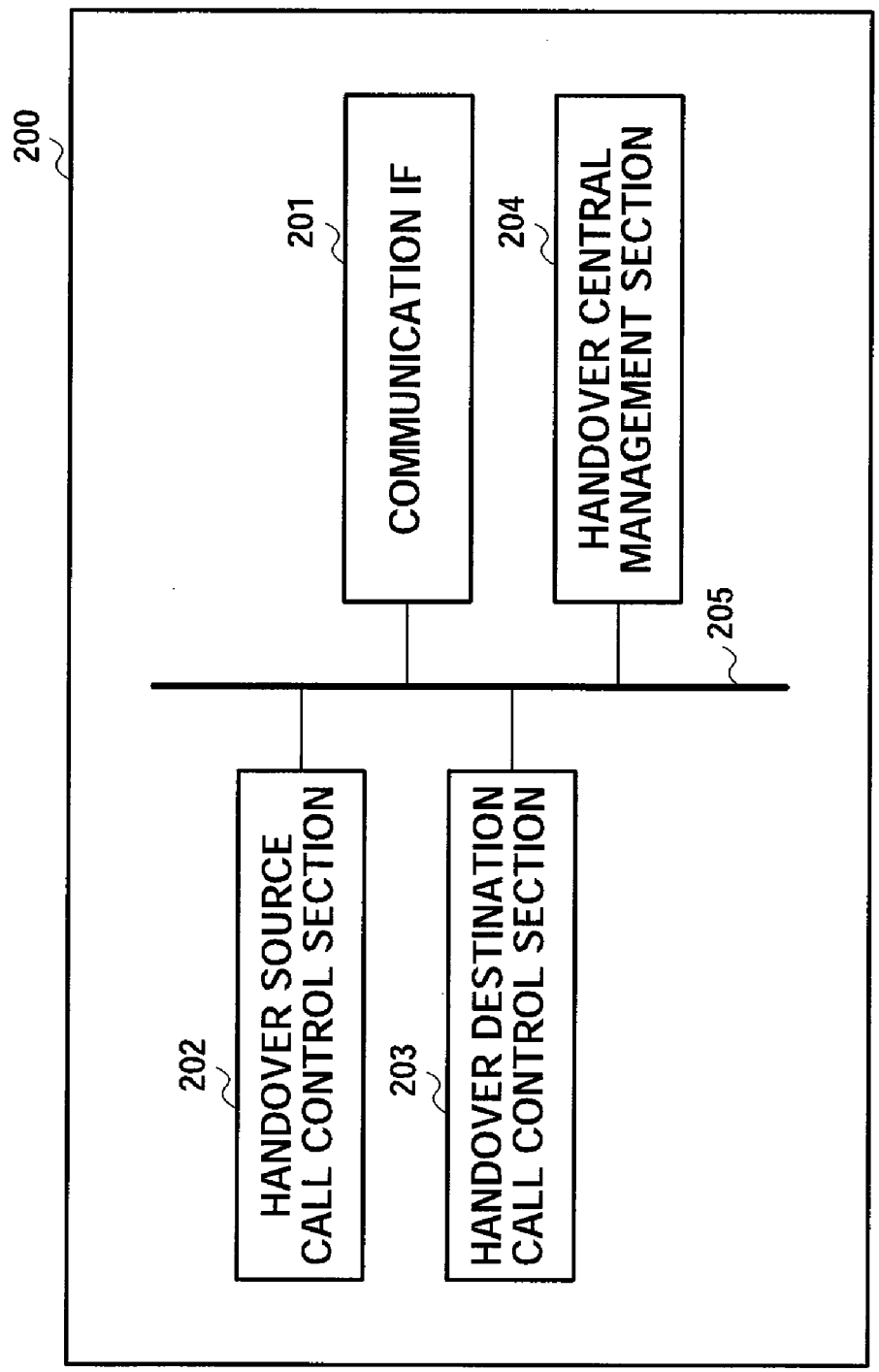
FIG. 5 is a block diagram showing the configuration of a handover management server, according to Embodiment 1 of the present invention.

Next, the configuration of handover management server 200 will be explained using FIG. 5. FIG. 5 shows a block diagram showing the configuration of handover management server 200.

Communication IF 201, source domain call control section 202, target domain call control section 203 and handover central management section 204 are connected by bus 205.

Communication IF 201 receives a VoIP voice communication signal by a wireless LAN system and a circuit-switched voice communication signal by a mobile communication (cellular) system, and outputs the received signals to source domain call control section 202, target domain call control section 203 and handover central management section 204, via bus 205. Further, communication IF 201 transmits the signals inputted from source domain call control section 202, target domain call control section 203 and handover central management section 204, via bus 205. Further, communication IF 201 outputs the received message for requesting a handover to handover central management section 204, and transmits a message for requesting disconnection of the call with the source domain inputted from source domain call control section 202 and a message for requesting establishment of a call with the target domain.

Source domain call control section 202 controls calls in the source domain. To be more specific, according to the command of handover central management section 204, source domain call control section 202 outputs the message for requesting disconnection of the call with the source domain, to communication IF 201.

Target domain call control section 203 controls calls in the target domain. To be more specific, according to the command of handover central management section 204, target domain call control section 203 outputs a message for requesting establishment of a call with the target domain, to communication IF 201.

Handover central management section 204 monitors the state of the call control conducted by source domain call control section 202 and the state of the call control conducted by target domain call control section 203, and controls a handover. To be more specific, if a message for requesting a handover is inputted from communication IF 201, handover central management section 204 commands source domain call control section 202 to output a message for requesting disconnection of the call with the source domain and commands target domain call control section 203 to output a message for requesting establishment of a call with the target domain.

Figure 6:
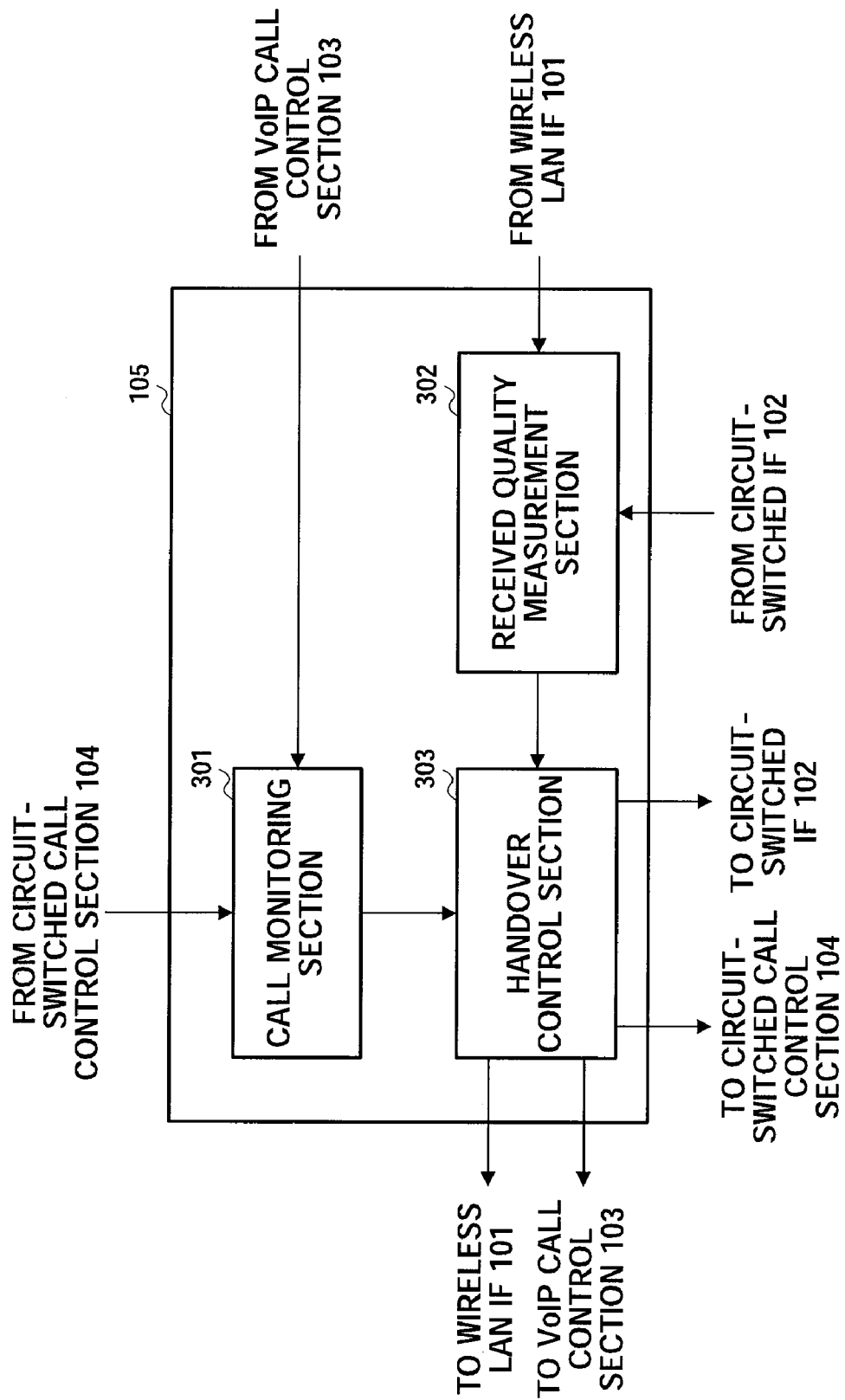
FIG. 6 is a block diagram showing the configuration of a handover section, according to Embodiment 1 of the present invention.

Next, handover section 105 of communication terminal apparatus 100 will be explained in detail using FIG. 6. FIG. 6 is a block diagram showing the configuration of handover section 105.

Call monitoring section 301 monitors call disconnection or call establishment in VoIP call control section 103 and circuit-switched call control section 104. Further, call monitoring section 301 monitors whether or not a message for requesting disconnection of a call is inputted to VoIP call control section 103 and circuit-switched call control section 104. Then, call monitoring section 301 outputs the monitor results to handover control section 303.

Received quality measurement section 302 measures the received quality of a VoIP voice communication signal by the wireless LAN system and the received quality of a circuit-switched voice communication signal by the mobile communication (cellular) system. Then, received quality measurement section 302 outputs the measurement results to handover control section 303.

Based on the measurement results of the received quality inputted from received quality measurement section 302, handover control section 303 determines whether or not to perform handover between the wireless LAN system and the mobile communication (cellular) system. Then, upon determining performing the handover, handover control section 303 creates a message for requesting a handover, and outputs the created message to wireless LAN IF 101 or to circuit-switched IF 102. Further, upon determining performing the handover, handover control section 303 refers to the monitor results inputted from call monitoring section 301, and, if VoIP call control section 103 or circuit-switched call control section 104 receives a message for requesting disconnection of the call with the source domain and a call with the target domain is not established, handover control section 303 commands VoIP call control section 103 or circuit-switched call control section 104 to disable the received message for requesting call disconnection.

Figure 7:
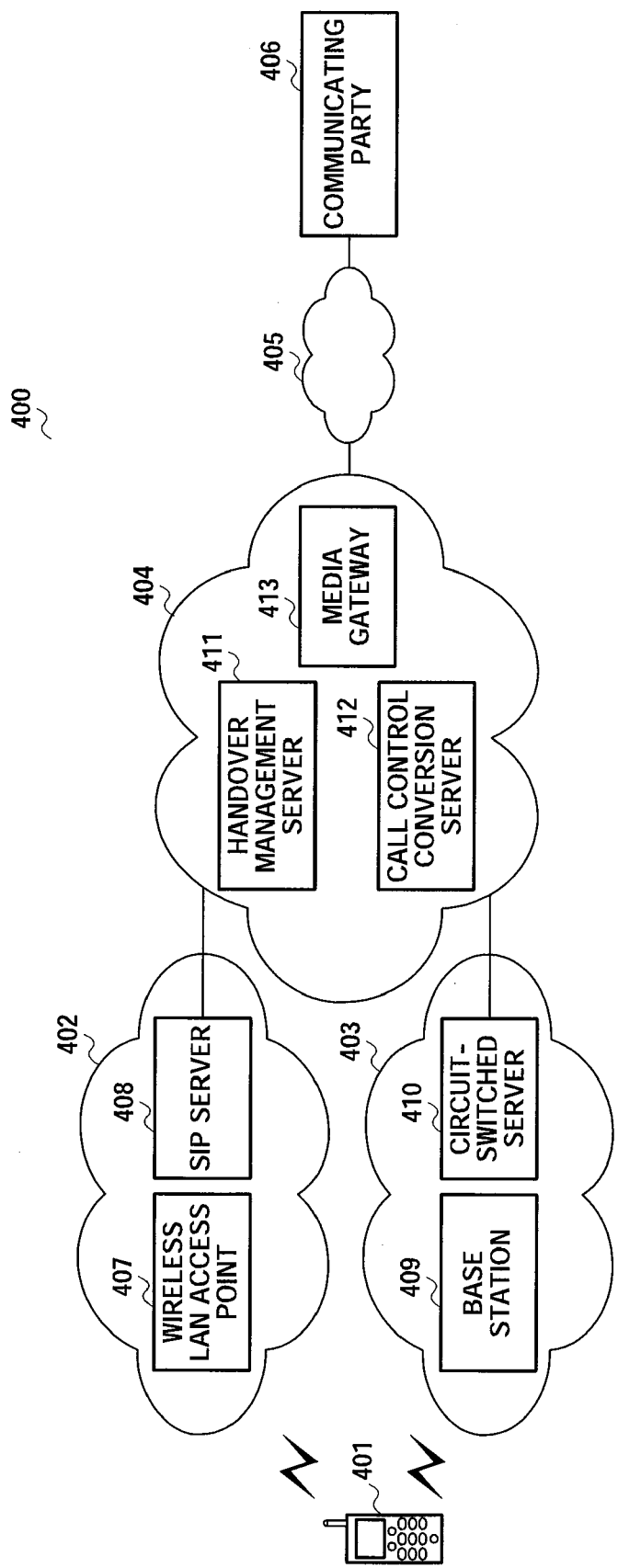
FIG. 7 shows the network configuration, according to Embodiment 1 of the present invention.

FIG. 7 shows the configuration of network 400 according to Embodiment 1.

Network 400 has communication terminal apparatus 401, IP network 402, circuit-switched network 403, integration network 404, network 405 and communicating party 406. Further, IP network 402 includes wireless LAN access point 407 and SIP server 408. Further, circuit-switched network 403 includes base station 409 and circuit-switched server 410. Further, integration network 404 includes handover management server 411, call control conversion server 412 and media gateway 413.

Communication terminal apparatus 401, which has the same configuration as communication terminal apparatus 100 shown in FIG. 4 and FIG. 6, is capable of circuit-switched voice communication and VoIP voice communication.

Communicating party 406 is a communication apparatus conducting voice communication with communication terminal apparatus 401 through network 405. The communication method for which communicating party 406 conducts voice communication is not particularly limited.

Wireless LAN access point 407 is provided because communication terminal apparatus 401 connects to an IP network and pursuant to IEEE 802.11a, b and g and so on.

SIP server 408 performs VoIP call control (here, SIP).

Base station 409 is provided to allow communication terminal apparatus 401 to connect to a circuit-switched network.

Circuit-switched server 410 performs circuit-switched call control in a circuit-switched network.

Handover management server 411, which has the same configuration as handover management server 200 shown in FIG. 5, manages handover call control. Further, handover management server 411 collectively manages a circuit-switched call control message and a VoIP call control message. In Embodiment 1, handover management server 411 converts a circuit-switched call control message into a VoIP call control (SIP) message, and processes the converted message.

Call control conversion server 412 converts between a circuit-switched call control message and a VoIP call control message.

Media gateway 413 relays a call (voice media) with communicating party 406 and converts the circuit-switched or VoIP voice media which communication terminal apparatus 401 transmits, into voice media which communicating party 406 can receive. Further, media gateway 413 converts the voice media communicating party 406 transmits, into circuit-switched voice media or VoIP voice media.

Figure 8:
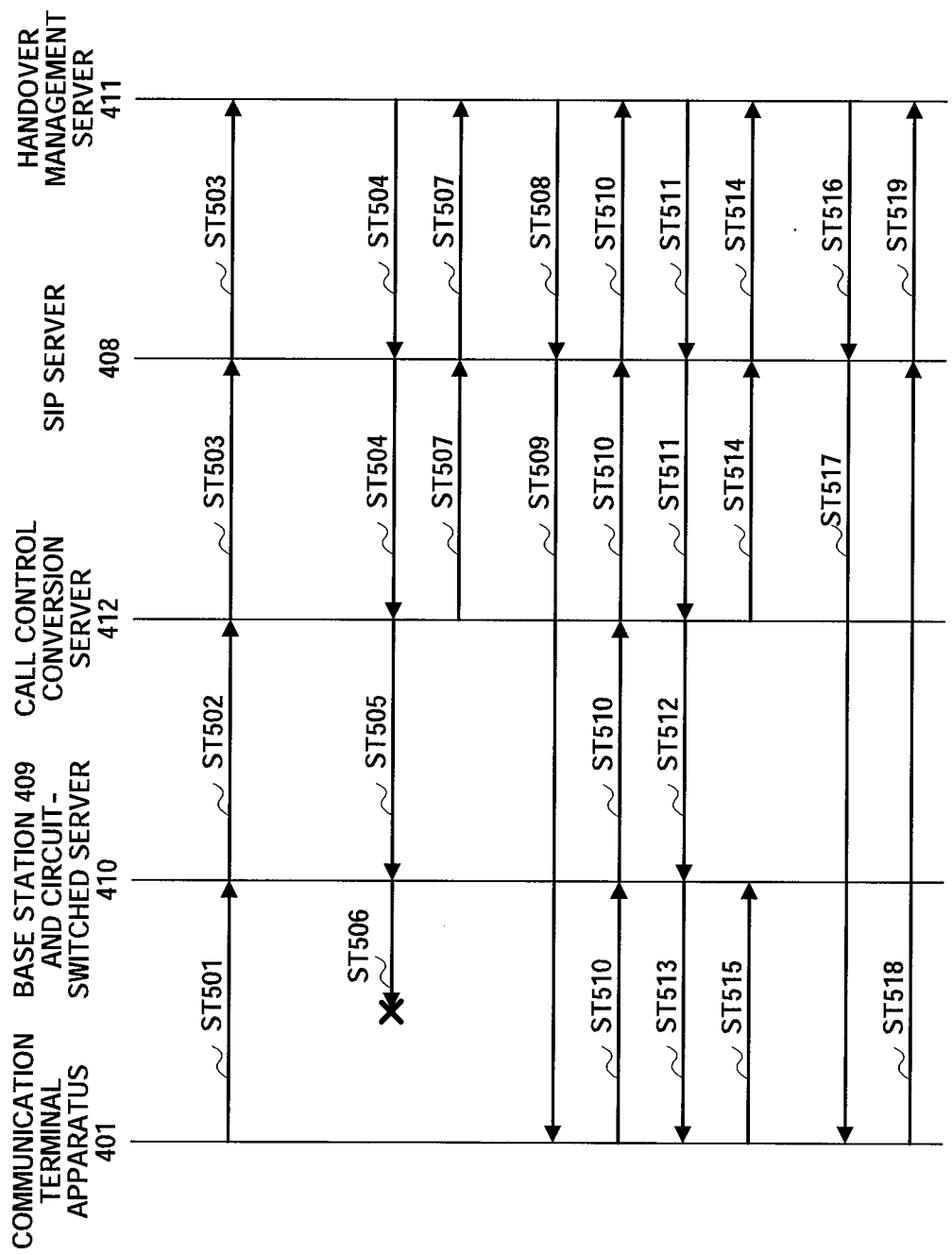
FIG. 8 illustrates a sequence diagram showing the handover method, according to Embodiment 1 of the present invention.

Next, handover method in network 400 will be explained using FIG. 8. FIG. 8 is a sequence diagram showing the handover method.

In FIG. 8, communication terminal apparatus 401 establishes a VoIP voice communication call by an SIP via an IP network and conducts VoIP voice communication, and has finished the registration for continuing receiving VoIP voice communication services. Further, the voice media is relayed and format-converted by the media gateway, and, if a handover occurs, call control is conducted between communication terminal apparatus 401 to perform handover and an apparatus in the network.

Due to the reasons of bad channel conditions between communication terminal apparatus 401 and wireless LAN access point 407 and good channel conditions between communication terminal 401 and base station 409, and so on, handover section 105 of communication terminal apparatus 401 determines to perform handover from VoIP voice communication via IP network 402 to circuit-switched voice communication via circuit-switched network 403. To be more specific, received quality measurement section 302 of handover section 105 measures the received quality of a VoIP voice communication signal by the wireless LAN system and the received quality of a circuit-switched voice communication signal by the mobile communication (cellular) system. Then, from the measurement results of received quality, handover control section 303 of handover section 105 can know bad channel conditions between communication terminal apparatus 401 and wireless LAN access point 407, and good channel conditions between communication terminal 401 and base station 409. If the received quality of the VoIP voice communication signal by the wireless LAN system becomes poorer than a threshold value and the received quality of the circuit-switched voice communication signal by the mobile communication (cellular) system is equal to and more than a threshold value, handover control section 303 of handover section 105 determines to perform handover from VoIP voice communication via IP network 402 to a circuit-switched voice communication via circuit-switched network 403.

Next, handover control section 303 of handover section 105 transmits a setup message, which starts circuit-switched call processing and requests a handover, via circuit-switched IF 102 (step ST 501).

Next, circuit-switched server 410 receives the setup message via base station 409, acknowledges a handover command from communication terminal apparatus 401, and transmits an IAM message, which is a handover command, to handover management server 411 (step ST 502). At this time, a setup message, which starts circuit-switched call processing, is converted into another call control message and then transferred.

Next, call control conversion server 412 converts an IAM message, which is a handover command, into an INVITE message, and transmits the INVITE message to handover management server 411 (step ST 503).

Next, handover management server 411 receives an INVITE, which is a message for a handover command. Handover central management section 204 of handover management server 411 commands target domain call control section 203 to establish a call for a circuit-switched network, which is the target domain. Then, target domain call control section 203 transmits a 200 OK, which is a message for connection notification for establishing a call for the circuit-switched network, which is the target domain network, via communication IF 201 (step ST 504).

Next, call control conversion server 412 converts a 200 OK, which is a connection notification message for establishing a circuit-switched call, into an ANM, and transmits the ANM to circuit-switched server 410 (step ST 505).

Next, circuit-switched server 410 receives the ANM, and transmits a connect message, which is a connection notification for establishing call for a circuit-switched network, which is the target domain, via base station 409. However, communication terminal apparatus 401 cannot receive the connect message because of bad channel conditions between base station 409 and terminal communication apparatus 401 (step ST 506).

Further, if communication terminal apparatus 401 cannot receive a connect message, which is a circuit-switched connection notification, call control conversion server 412 transmits an Ack message, which is an acknowledgement in response to a 200 OK message, which is a connection notification (step ST 507).

Next, handover management server 411 receives the Ack, which is an acknowledgment message. Handover central management section 204 of handover management server 411 commands source domain call control section 202 to disconnect the call from VoIP voice communication, which is the source domain. Then, to disconnect the already established call from VoIP voice communication, which is the source domain, source domain call control section 202 of handover management server 411 transmits a bye message, which is a disconnection request for disconnecting VoIP voice communication via communication IF 201 (step ST 508).

Next, SIP server 408 having received the bye message, which is a disconnection request, transmits the bye message, which is a disconnection request, via wireless LAN access point 407 (step ST 509).

Next, communication via wireless LAN is correctly carried out, and call monitoring section 301 of handover section 105 acknowledges that VoIP call control section 103 has received the bye message.

Next, call monitoring section 301 learns that a circuit-switched voice communication call is not established because circuit-switched call control section 104 has not received the connect message.

Next, handover control section 303 commands VoIP call control section 103 to disable the received bye message, and creates a message for requesting a handover again. At this time, handover control section 303 can use one of the method of creating the same message as the message created for the first time requesting a handover, the method of creating a message including an identifier indicating that the handover request is not for the first time, and the method of creating a specific message for requesting a handover again instead of a setup message.

Next, circuit-switched IF 102 of communication terminal apparatus 401 transmits a message for requesting a handover again created by handover control section 303 (step ST 510).

Next, handover central management section 204 of handover management server 411 learns source domain call control section 202 has transmitted a bye message. Then, upon receiving a command message for a handover in a state where source domain call control section 202 has established a call with the source domain, handover central management section 204 commands target domain call control section 203 to transmit a 200 OK message, which is a connection notification, and, target domain call control section 203 transmits the 200 OK message, which is a connection notification, via communication IF 201 (step ST 511).

Next, call control conversion server 412 converts a 200 OK, which is a connection notification message for establishing a circuit-switched call, into an ANM, and transmits the ANM to circuit-switched server 410 (step ST 512).

Next, circuit-switched server 410 receives the ANM, and transmits a connect message, which is a connection notification for establishing a call for a circuit-switched network, which is the target domain, via base station 409 (step ST 513).

Next, call control conversion server 412 in the network transmits an Ack message, which is an acknowledgement in response to a 200 OK message, which is a connection notification (step ST 514).

Next, communication terminal apparatus 401 having received the connect message transmits the connect ACK message, which is an acknowledgement in response to the connect message (step ST 515).

Handover central management section 204 of handover management server 411 commands source domain call control section 202 to transmit a bye message, which is a disconnection request, and, source domain call control section 202 transmits a bye message, which is a disconnection request (step ST 516).

Next, SIP server 408 having received a bye message, which is a disconnection request, transmits a bye message, which is a disconnection request, via wireless LAN access point 407 (step ST 517).

Next, the communication via wireless LAN is correctly carried out, and call monitoring section 301 of handover section 105 learns that VoIP call control section 103 has received the bye message.

Next, call monitoring section 301 acknowledges that a circuit-switched voice communication call is not established because circuit-switched call control section 104 has received the connect message.

Next, communication terminal 401 transmits a 200 OK message, which is an acknowledgement in response to the bye message, which is a disconnection request (step ST 518).

Next, SIP server 408 receives a 200 OK message, and transmits the 200 OK message to handover management server 411 (step ST 519).

By receiving the 200 OK message, handover management server 411 is able to learn communication terminal apparatus 401 has succeeded in the handover.

Although coordination with the networks is necessary, the switching of media by handover section 105 of communication terminal apparatus 401 may be carried out after a connect message is received in ST 513, that is, after a call with the target domain is established, before a 200 OK message is transmitted in ST 518, that is, before the call with the source domain is disconnected.

In this way, according to Embodiment 1, in a case where a request to disconnect a call with the source domain is received and yet a call with the target domain is not established, a request to disconnect the call with the source domain is disabled and a handover is requested again, so that, even when call control messages are lost or when call control messages are outrun, it is possible to prevent a circuit-switched network call and a IP network call from being disconnected at the same time and continue providing services without increasing loads of apparatuses such as servers in the networks. Further, according to Embodiment 1, the radio communication terminal is allowed to detect a lost or outrun message earlier than the servers in the network, so that it is possible to prevent state of servers in networks and a state of the radio communication terminal from being mismatched. Further, according to Embodiment 1, if, as a message for requesting a handover again, a message including an identifier indicating that the handover request is not for the first time, a handover can be executed again, and, a receiving side receiving a message for requesting a handover again can easily determines whether the received message is a handover request for the first time or a handover request again. Further, according to Embodiment 1, it is possible to perform reliable handover without changing predefined protocol requirements such that, in step ST 515, when circuit-switched server 410 receives the connect Ack message, circuit-switched server 410 transmits a response message in response to an ANM, to call control conversion server 412.

With Embodiment 1, although a handover for a second time is requested by transmitting a circuit-switched message via the circuit-switched network, which is the target domain, Embodiment 1 is not limited to this, and a handover for a second time may be requested by transmitting a VoIP message via an IP network, which is the source domain.

Embodiment 2

Figure 9:
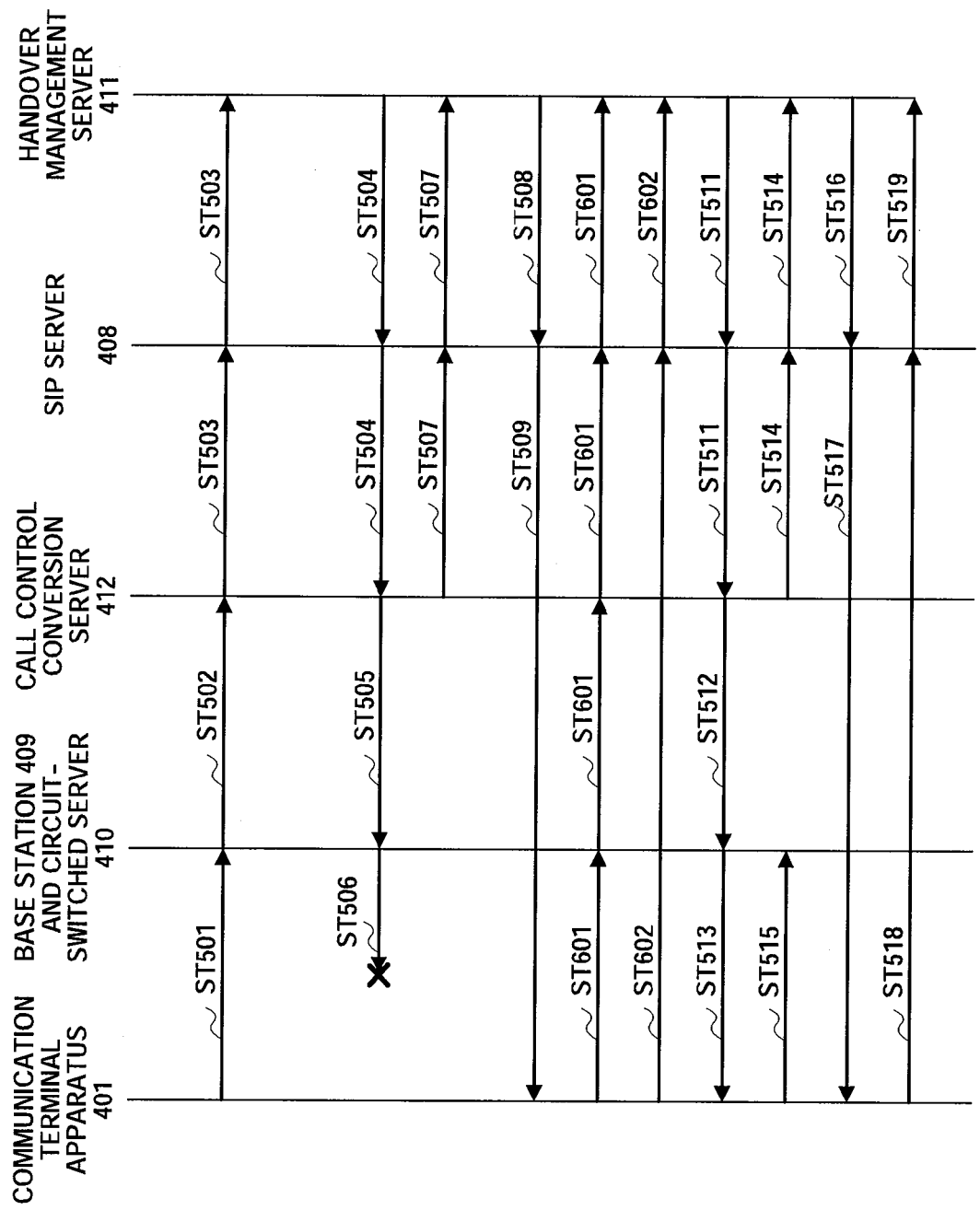
FIG. 9 illustrates a sequence diagram showing the handover method, according to Embodiment 2 of the present invention.

FIG. 9 a sequence diagram showing the handover method according to Embodiment 2 of the present invention. In FIG. 9, the same numbers are assigned to the same steps as in FIG. 8 and the description thereof will be omitted. Further, in Embodiment 2, the configuration of the communication terminal apparatus is the same as in FIGS. 4 and 6, the configuration of the handover management server is the same as in FIG. 5, and the network configuration is the same as in FIG. 7, and the description thereof will be omitted.

Features of Embodiment 2 include using both a wireless LAN system and a mobile communication (cellular) system in handover control section 303 upon requesting a handover again.

SIP server 408 having received a bye message, which is a disconnection request, transmits the bye message, which is a disconnection request via wireless LAN access point 407 (step ST 509).

Next, the communication via wireless LAN is correctly carried out, and call monitoring section 301 of handover section 105 learns that VoIP call control section 103 has received the bye message.

Next, call monitoring section 301 acknowledges that a circuit-switched voice communication call is not established because circuit-switched call control section 104 has not received the connect message.

Next, handover control section 303 creates a message for requesting a handover from VoIP voice communication to circuit-switched voice communication. At this time, handover control section 303 creates both a VoIP call control message via IP network 402 and a circuit-switched call control message via circuit-switched network 403.

Next, as a message for requesting a handover again, circuit-switched IF 102 of communication terminal apparatus 401 transmits a circuit-switched call control message via circuit-switched network 403 (step ST 601) wireless LAN IF 101 of communication terminal apparatus 401 transmits a VoIP call control message via IP network 402 (step ST 602).

Next, handover central management section 204 of handover management server 411 acknowledges source domain call control section 202 has transmitted the bye message. Then, upon receiving a command message for a handover in a state where source domain call control section 202 has established a call with the source domain, handover central management section 204 commands target domain call control section 203 to transmit a 200 OK message, which is a connection notification, and, target domain call control section 203 transmits the 200 OK message, which is a connection notification (step ST 511).

In this way, according to Embodiment 2, in addition to the above-described advantage of Embodiment 1, upon requesting a handover again, both a message for requesting a second circuit-switched handover via circuit-switched network 403, which is a target domain, and a message for requesting a handover again used for VoIP via IP network 402, which is a source domain, are transmitted, so that it is possible to reliably report that the target domain network has not established and it is likely that a handover for a second time is successful.

Embodiment 3

Figure 10:
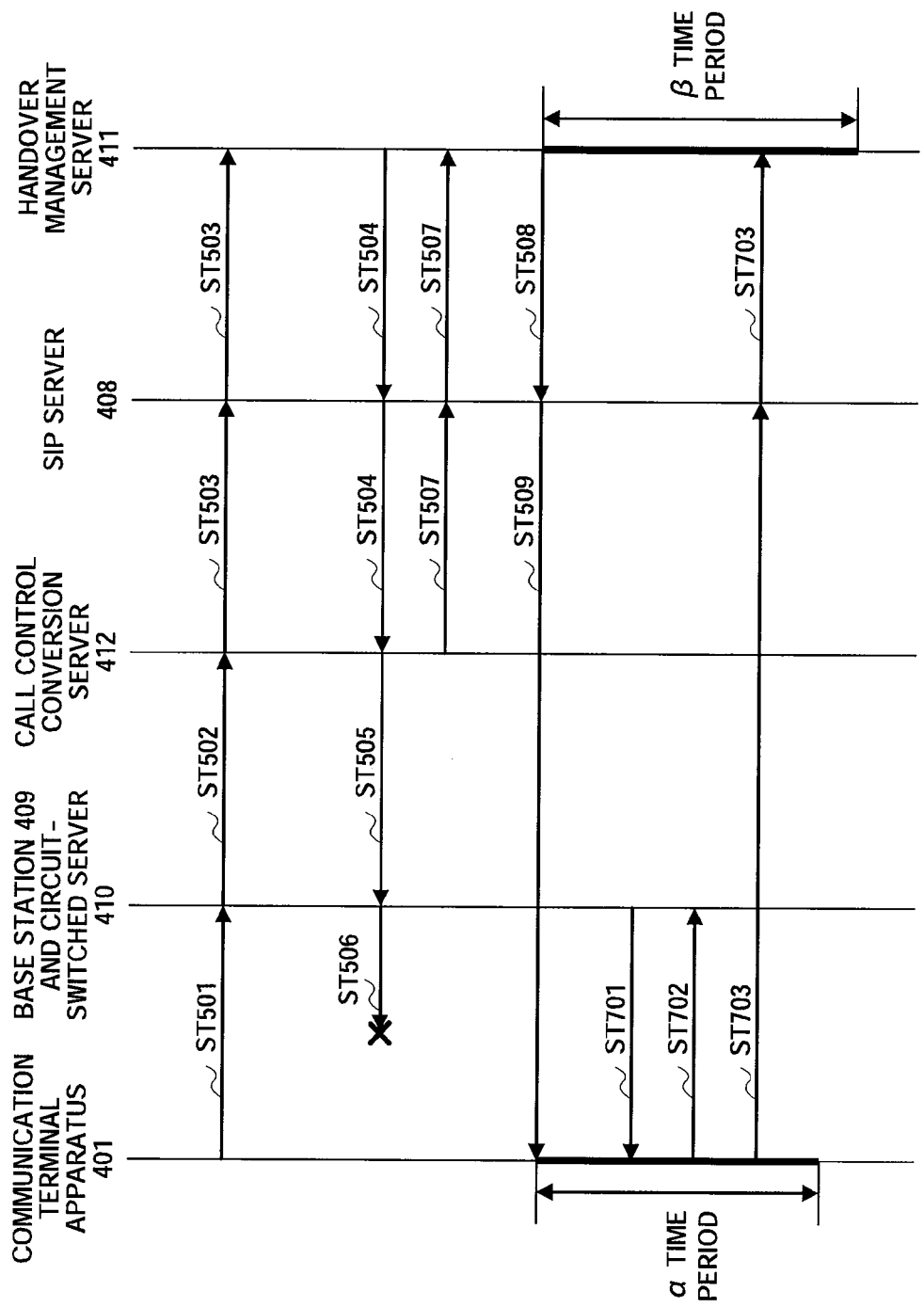
FIG. 10 illustrates a sequence diagram showing the handover method, according to Embodiment 3 of the present invention.
Figure 11:
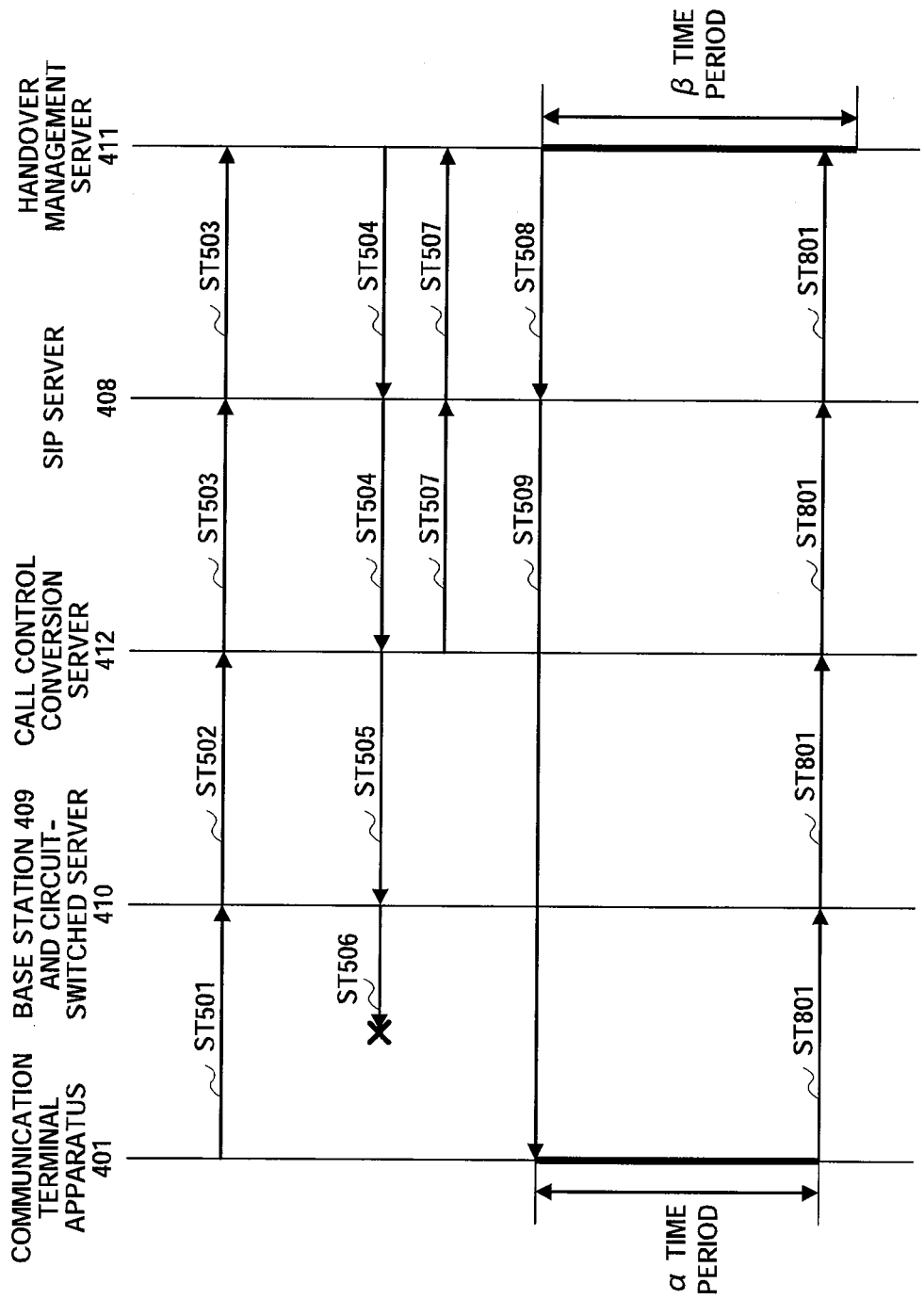
FIG. 11 illustrates a sequence diagram showing the handover method, according to Embodiment 3 of the present invention.

FIGS. 10 and 11 are sequence diagrams showing the handover method according to Embodiment 3 of the present invention. In FIGS. 10 and 11, the same numbers are assigned to the same steps as in FIG. 8 and the description thereof will be omitted. Further, in Embodiment 3, the configuration of the communication terminal apparatus is the same as in FIGS. 4 and 6, the configuration of the handover management server is the same as in FIG. 5, and the network configuration is the same as in FIG. 7, and the description thereof will be omitted.

Features of Embodiment 3 include requesting a handover again when a communication terminal apparatus fails to receive a message for requesting establishment of a call with the target domain within a predetermined period.

First, a case where communication terminal apparatus 401 receives a connect message with delay, will be explained using FIG. 10.

SIP server 408 having received a bye message, which is a disconnection request, transmits the bye message, which is a disconnection request, via wireless LAN access point 407 (step ST 509).

Next, communication terminal apparatus 401 receives the bye message, and for a given time period α (call establishment waiting period) from receiving the bye message in communication terminal apparatus 100, handover control section 303 of handover section 105 waits a monitor result in an event that circuit-switched call control section 104 has received a call connection notification message for the target domain, from call monitoring section 301.

Next, communication terminal apparatus 401 receives a connect message, which is a call connection notification for the target domain and which is a circuit-switched call control message, in the given time period, α (step ST 701).

Next, by receiving a monitor result from call monitoring section 301 in an event that circuit-switched call control section 104 has received a connect message, handover control section 303 of handover section 105 knows that call control section 104 has received a connect message.

Next, communication terminal apparatus 401 transmits an connect Ack message, which is an acknowledgement in response to the connect message (step ST 702).

Next, wireless LAN IF 101 of communication terminal apparatus 401 transmits a 200 OK message, which is a response to the bye message, which is a VoIP call control message (step ST 703).

Next, handover management server 411 receives the 200 OK message, and, the bye message has been transmitted in step ST 508, and then handover central management section 204 of handover management server 411 knows to have received the 200 OK message in a predetermined period β (β>α). Then, source domain call control section 202 of handover management server 411 commands source domain call control section 202 to disconnect the VoIP voice communication call, and source domain call control section 202 disconnects the VoIP voice communication call.

Although coordination with the networks is necessary, the switching of media by handover section 105 of a communication terminal apparatus, that is, handover, may be carried out after a connect message is received in step ST 701 and a call is established with the target domain, before a 200 OK message transmission in step ST 703 makes the call with the source domain to be disconnected.

Next, a case where communication terminal apparatus 401 has not received a connect message will be explained using FIG. 11.

SIP server 408 having received a bye message, which is a disconnection request, transmits the bye message, which is a disconnection request, via wireless LAN access point 407 (step ST 509).

Next, communication terminal apparatus 401 receives the bye message, and for the given time period α from receiving the bye message in communication terminal apparatus 100, handover control section 303 of handover section 105 waits a monitor result in an event that circuit-switched call control section 104 has received a call connection notification message for the target domain, inputted from call monitoring section 301.

Then, handover control section 303 of handover section 105 knows that circuit-switched call control section 104 has not received a connect message, which is a call connection notification for the target domain in the given time period α, disables the bye message, which is a disconnection request that VoIP call control section 103 has received in step ST 509, and transmits a handover command message again (step ST 801).

In this way, according to Embodiment 3, in addition to the above-described advantage of Embodiment 1, a handover is performed if a connection notification message is received until a given time period α passes, so that it is possible to switch media even when the call connection notification message for a target domain is received later than a call disconnection request message from a source domain. Further, according to Embodiment 3, time period α is set shorter than time period β, so that, in a case where the communication terminal apparatus has already established a call with the target domain, it is possible to prevent a handover management server from incorrectly giving up establishing a call for the target domain.

In Embodiment 3, handover control section 303 of handover section 105 can prevent communication from being suspended by adjusting a time period α and shorten the time required for a handover. Further, in Embodiment 3, handover central management section 204 of handover management server 411 can prevent communication from being suspended by adjusting time period β. For example, in a case where handover section 105 of the communication terminal apparatus knows not to have received a connect message in the time period α, when handover section 105 determines that VoIP voice communication has already been disconnected by detecting that voice media is not received, handover section 105 shorten the time period α. On the other hand, in a case of receiving a connect message immediately after time period α passes, handover control section 303 makes the time period α longer.

Further, with Embodiment 3, although, a handover for a second time is requested by transmitting a circuit-switched message via the circuit-switched network of the target domain, Embodiment 3 is not limited to this, and, a handover for a second time may be requested by transmitting a message used for VoIP via the IP network of the source domain.

Embodiment 4

Figure 12:
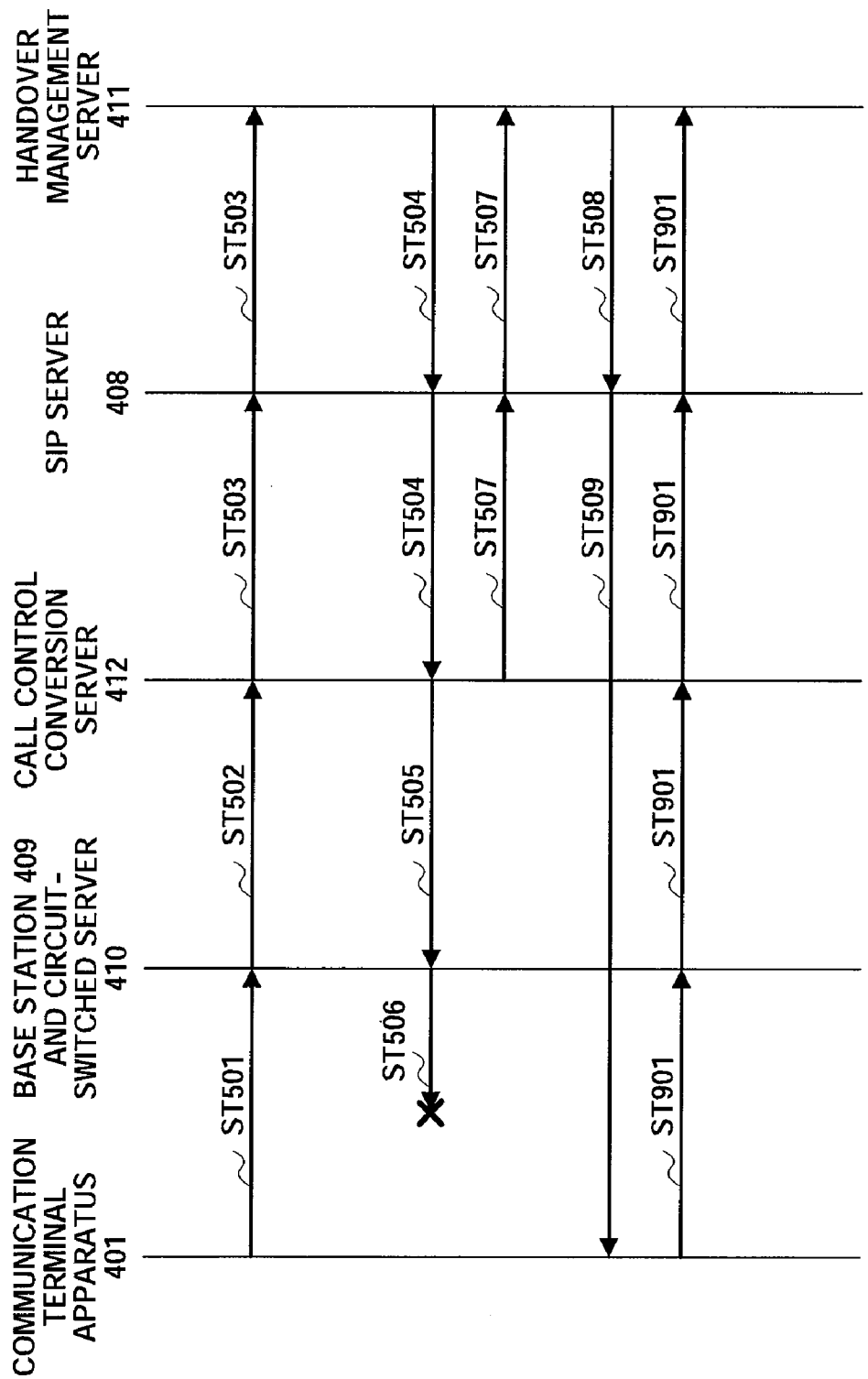
FIG. 12 illustrates a sequence diagram showing the handover method, according to Embodiment 4 of the present invention.

FIG. 12 a sequence diagram showing the handover method according to Embodiment 4 of the present invention. In FIG. 12, the same numbers are assigned to the same steps as in FIG. 8 and the description thereof will be omitted. Further, in Embodiment 4, the configuration of the communication terminal apparatus is the same as in FIGS. 4 and 6, the configuration of the handover management server is the same as in FIG. 5, and the network configuration is the same as in FIG. 7, and the description thereof will be omitted.

Features of Embodiment 4 include quitting a handover when the communication terminal apparatus receives a call disconnection request with the source domain and does not establish a call with the target domain.

SIP server 408 having received a bye message, which is a disconnection request, transmits the bye message, which is a disconnection request, via wireless LAN access point 407 (step ST 509).

Next, the communication via wireless LAN is correctly carried out, and call monitoring section 301 of handover section 105 learns that VoIP call control section 103 has received the bye message.

Next, call monitoring section 301 acknowledges that a circuit-switched voice communication call is not established because circuit-switched call control section 104 has not received the connect message.

Next, handover control section 303 commands VoIP call control section 103 to disable the received bye message, and creates a message for quitting the handover.

Next, circuit-switched IF 102 of communication terminal apparatus 401 transmits the message for quitting the handover created by handover control section 303 (step ST 901).

Next, handover management server 411 receives the message for quitting the handover, handover central management section 204 commands source domain call control section 202 not to disconnect the VoIP call from source domain and commands target domain call control section 203 to give up establishing a call with the target domain. This enables communication terminal apparatus 401 to continue using the call from the source domain.

In this way, according to Embodiment 4, in a case where a request to disconnect a call with the source domain is received and yet a call with the target domain is not established, a request to disconnect the call with the source domain is disabled and a handover is quit, so that it is possible to prevent both a circuit-switched network call and an IP network call from being disconnected at the same time and continue providing services without increasing loads of apparatuses such as servers in the networks. Further, according to Embodiment 4, the radio communication terminal is allowed to detect a lost or outrun message earlier than the servers in the network, so that it is possible to prevent state of servers in networks and a state of the radio communication terminal from being mismatched.

With Embodiment 4, although, a handover is quit by transmitting a circuit-switched message via the circuit-switched network of the target domain, Embodiment 4 is not limited to this, and, a handover may be quit by transmitting a VoIP message via the IP network of the source domain.

Although cases have been explained above with Embodiments 1 to 4 where handover is performed from VoIP communication by SIP to circuit-switched voice communication, the present invention is not limited to this and may be applied to services where handover is performed from circuit-switched voice communication to VoIP communication by SIP, and where handover is performed between different call control networks to enable handover even when, for example, packet loss occurs. Further, in the above-described Embodiments 1 to 4, when the communication terminal apparatus does not receive a connect message in response to a request for a handover again and nevertheless receives a bye message, the communication terminal apparatus may request a handover once again, or, if the communication terminal apparatus has repeated requesting a handover over and over again and nevertheless does not receive a connect message, the communication terminal apparatus may quit a handover.

INDUSTRIAL APPLICABILITY

The communication terminal apparatus, network system and handover method according to the present invention is suitable for connecting with different communication schemes and performing handover between networks adopting different communication schemes.

The invention claimed is:

1. A communication terminal apparatus comprising:
a call control section configured to perform call control including call establishment and call disconnection for each of plural networks that are in accordance with different communication schemes, respectively; and
a handover control section configured to
request a handover from a source network with a first communication scheme to a target network with a second communication scheme,
prevent the call control section from disconnecting a call with the source network after a disconnection request to disconnect the call with the source network is received from a server of the networks, when a call with the target network is not established in the call control section,
after receiving the disconnection request to disconnect the call with the source network, for a call establishment waiting time period, wait for a notification of establishment of the call with the target network while preventing the call control section from disconnecting the call with the source network,
allow the call control section to disconnect the call with the source network, when the notification of establishment of the call with the target network is received before the call establishment waiting time period expires, and
quit the requested handover after the call establishment waiting time period expires, when the notification of establishment of the call with the target network is not received during the call establishment waiting time period.

2. The communication terminal apparatus according to claim 1, wherein the handover control section is further configured to repeatedly request the handover from the source network to the target network, while preventing the call control section from disconnecting the call with the source network after the disconnection request to disconnect the call with the source network is received from the server of the networks, when the call with the target network is not established in the call control section.

3. The communication terminal apparatus according to claim 2, wherein the handover control section is further configured to repeat the request for the handover using of the plural networks that are in accordance with different communication schemes.

4. The communication terminal apparatus according to claim 1, wherein, when the call with the target domain network is not established in the call control section the handover control section issues a handover-quitting message while preventing the call control section from disconnecting the call with the source network.

5. A server configured for communicating with the communication terminal apparatus of claim 1, the server comprising:
a handover request accepting section the configured to accept a request for a handover;
a call disconnection request section configured to request the communication terminal apparatus to disconnect the call with the source network when the handover request accepting section accepts the request for the handover; and
a handover request quitting, configured to quit a handover procedure of the server when no response is received from the communication terminal apparatus in a predetermined determined time period that is longer than the call establishment waiting time period in response to the request of to disconnect the call with the source network from the call disconnection request section.

6. A handover method comprising the steps of:
performing call control including call establishment and call disconnection for each of plural networks that are in accordance with different communication schemes, respectively;
requesting a handover is from a source network with a first communication scheme to a target network with a second communication scheme;
preventing disconnection of a call with the source network after a disconnection request to disconnect the call with the source network is received from a server of the networks, when a call with the target network is not established;
after receiving the disconnection request to disconnect the call with the source network, for a call establishment waiting time period, wait for a notification of establishment of the call with the target network while preventing the call control section from disconnecting the call with the source network,
allow the call control section to disconnect the call with the source network, when the notification of establishment of the call with the target network is received before the call establishment waiting time period expires, and
quitting the requested handover after the call establishment waiting time period expires, when the notification of establishment of the call with the target network is not received during the call establishment waiting time period.

7. The communication terminal apparatus according to claim 2, wherein the handover control section is further configured to repeat the request for the handover by transmitting a message including an identifier indicating that the handover request is not an initial request.

8. A server configured for communicating with the communication terminal apparatus of claim 4, the server comprising:
a handover request accepting section configured to accept a request for a handover;
a call disconnection request section configured to transmit to the communication terminal apparatus the disconnection request to disconnect the call with the source network when the handover request accepting section accepts the request for the handover; and
a handover request quitting section configured to, upon receiving the handover-quitting message from the communication terminal apparatus, instruct the source network not to disconnect the communication terminal apparatus.

* * * * *